(12) United States Patent
Mori

(10) Patent No.: US 12,461,608 B2
(45) Date of Patent: Nov. 4, 2025

(54) INFORMATION PROCESSING APPARATUS, INFORMATION PROCESSING SYSTEM, INFORMATION PROCESSING METHOD, AND NON-TRANSITORY RECORDING MEDIUM

(71) Applicant: Hiroki Mori, Kanagawa (JP)

(72) Inventor: Hiroki Mori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/598,396

(22) Filed: Mar. 7, 2024

(65) Prior Publication Data

US 2024/0310932 A1    Sep. 19, 2024

(30) Foreign Application Priority Data

Mar. 16, 2023 (JP) ................... 2023-042258
Jan. 31, 2024 (JP) ................... 2024-013116

(51) Int. Cl.
*G06F 3/0354* (2013.01)
*G06F 3/041* (2006.01)

(52) U.S. Cl.
CPC ........ *G06F 3/03545* (2013.01); *G06F 3/0416* (2013.01)

(58) Field of Classification Search
CPC ................... G06F 3/03545; G06F 3/0416
See application file for complete search history.

(56) References Cited

U.S. PATENT DOCUMENTS

| | | | | |
|---|---|---|---|---|
| 9,575,575 | B2* | 2/2017 | Nicholson | G06F 3/0383 |
| 10,439,753 | B2* | 10/2019 | Imanilov | H04K 1/003 |
| 11,126,297 | B2* | 9/2021 | Gray | G06F 3/03545 |
| 11,600,169 | B2* | 3/2023 | Yamamoto | G06F 3/0441 |
| 11,687,192 | B2* | 6/2023 | Shahparnia | G06F 3/041661 |
| | | | | 345/173 |
| 12,153,764 | B1* | 11/2024 | Smith | G06F 3/03545 |
| 2005/0091297 | A1* | 4/2005 | Sato | G06F 3/0346 |
| | | | | 708/442 |
| 2011/0007037 | A1* | 1/2011 | Ogawa | G06F 3/046 |
| | | | | 345/179 |

(Continued)

FOREIGN PATENT DOCUMENTS

| | | |
|---|---|---|
| JP | S58-221476 A | 12/1983 |
| JP | 7-175574 A | 7/1995 |

(Continued)

*Primary Examiner* — Benyam Ketema
(74) *Attorney, Agent, or Firm* — IPUSA, PLLC

(57) ABSTRACT

An information processing apparatus includes circuitry to receive contact event information indicating that an electronic pen comes into contact with a screen, move event information indicating that the electronic pen moves in a state of being in contact with the screen, separation event information indicating that the electronic pen detaches from the screen, and button pressing information indicating that a button of the electronic pen is pressed, and invalidate an instruction according to the button pressing information during a writing operation period from a start of a writing operation using the electronic pen to an end of the writing operation. The start of the writing operation is determined based on a time when the move event information is received, and the end of the writing operation is determined based on a time when the separation event information is received.

8 Claims, 11 Drawing Sheets

(56) References Cited

U.S. PATENT DOCUMENTS

| | | | |
|---|---|---|---|
| 2012/0268420 A1* | 10/2012 | Marhefka | G06F 3/038 |
| | | | 345/174 |
| 2014/0118326 A1 | 5/2014 | Ozaki et al. | |
| 2014/0125606 A1* | 5/2014 | Namkung | G06F 1/169 |
| | | | 345/173 |
| 2014/0130028 A1 | 5/2014 | Maeda et al. | |
| 2014/0267078 A1* | 9/2014 | Kukulski | G06F 3/04162 |
| | | | 345/173 |
| 2015/0363012 A1* | 12/2015 | Sundara-Rajan | G06F 3/0441 |
| | | | 345/179 |
| 2016/0216783 A1* | 7/2016 | Nicholson | G06F 3/0383 |
| 2017/0063612 A1 | 3/2017 | Mori | |
| 2018/0196519 A1* | 7/2018 | Harris | G06F 3/016 |
| 2018/0246587 A1* | 8/2018 | Dekel | G06F 3/04166 |
| 2018/0267633 A1* | 9/2018 | Keidar | G06F 3/03545 |
| 2018/0343079 A1* | 11/2018 | Imanilov | H04L 63/0428 |
| 2019/0163343 A1* | 5/2019 | Ligameri | G06F 1/1641 |
| 2019/0187817 A1* | 6/2019 | Zimmerman | G06F 3/04162 |
| 2019/0272766 A1* | 9/2019 | Horie | G09B 5/14 |
| 2020/0356250 A1* | 11/2020 | Soli | G06F 3/03545 |
| 2021/0034214 A1* | 2/2021 | Gray | G06F 3/03545 |
| 2022/0300240 A1* | 9/2022 | Mori | G06F 3/1462 |
| 2024/0310932 A1* | 9/2024 | Mori | G06F 3/03545 |

FOREIGN PATENT DOCUMENTS

| | | |
|---|---|---|
| JP | 2004-062657 A | 2/2004 |
| JP | 2021-081986 A | 5/2021 |

\* cited by examiner

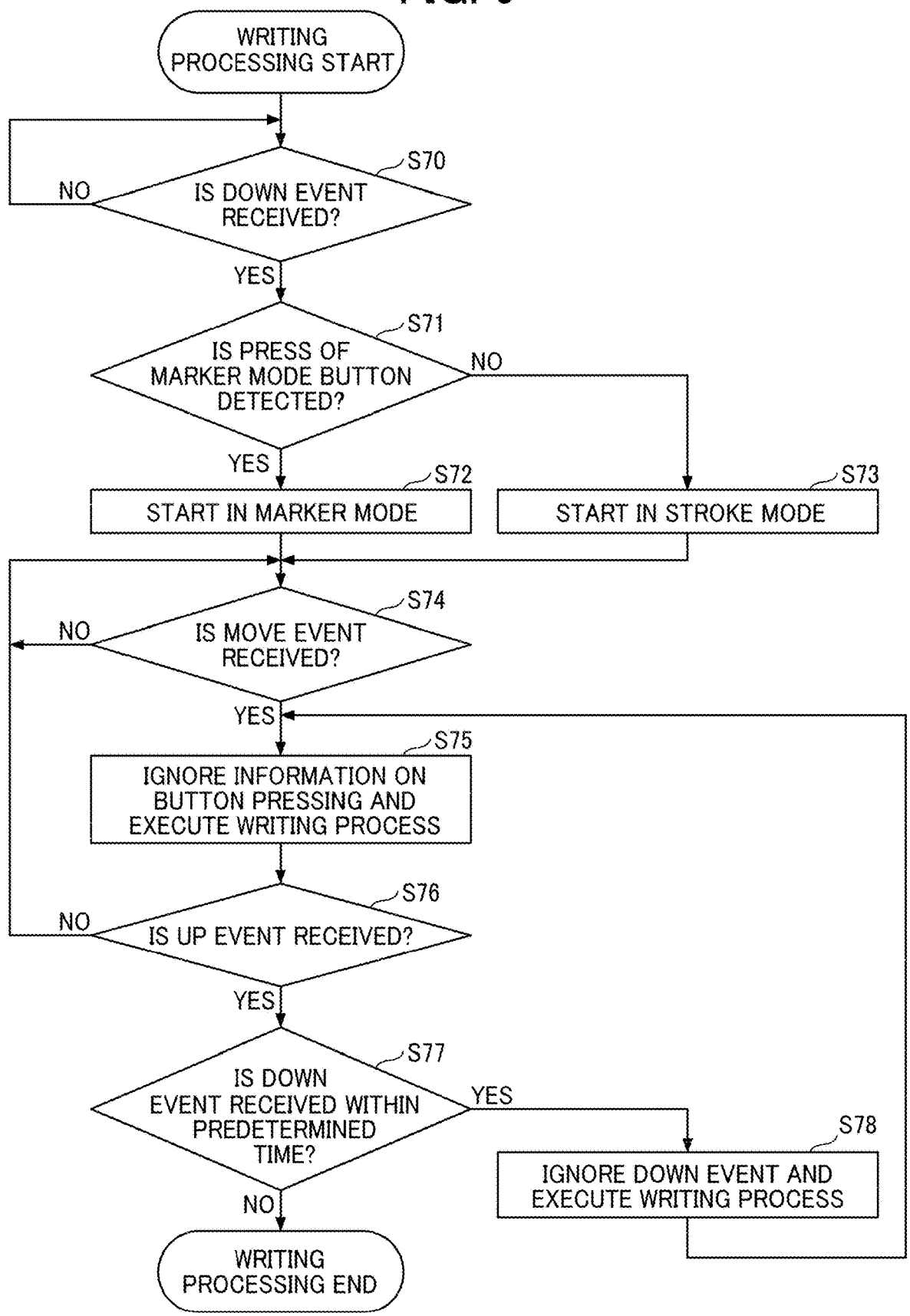

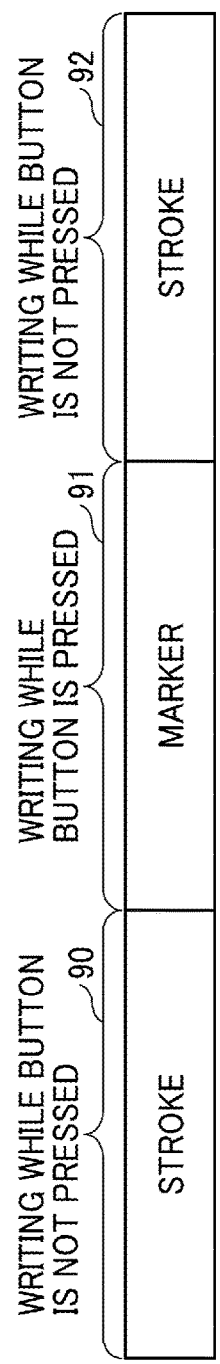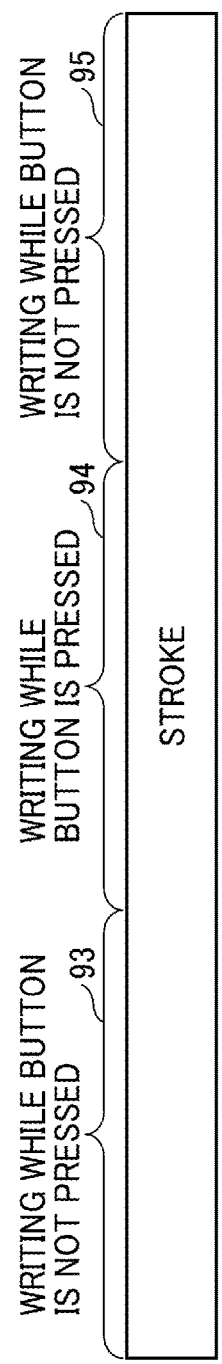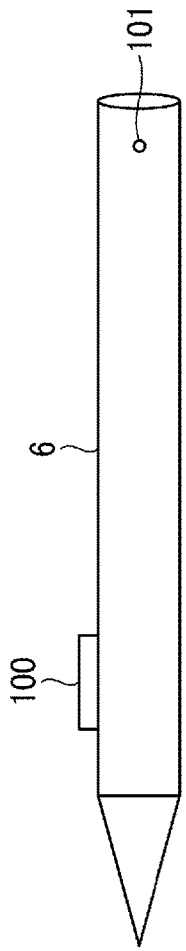

INFORMATION PROCESSING APPARATUS, INFORMATION PROCESSING SYSTEM, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2023-042258, filed on Mar. 16, 2023 and 2024-013116, filed on Jan. 31, 2024, in the Japan Patent Office, the entire disclosure of which is hereby incorporated by reference herein.

BACKGROUND

Technical Field

Embodiments of the present disclosure relate to an information processing apparatus, an information processing system, an information processing method, and a non-transitory recording medium.

Related Art

A technique of writing or drawing using an electronic pen in an information processing apparatus or an electronic whiteboard having a touch panel display is generally known. In addition, an operation such as erasing or marking can be assigned to a button that the electronic pen includes. A technique is disclosed, in which the pressing of the button of the electronic pen is notified only when the electronic pen is brought into contact with a screen of the touch panel display.

SUMMARY

In one aspect, an information processing apparatus includes circuitry to receive contact event information indicating that an electronic pen comes into contact with a screen, move event information indicating that the electronic pen moves in a state of being in contact with the screen, separation event information indicating that the electronic pen detaches from the screen, and button pressing information indicating that a button of the electronic pen is pressed, and invalidate an instruction according to the button pressing information during a writing operation period from a start of a writing operation using the electronic pen to an end of the writing operation. The start of the writing operation is determined based on a time when the move event information is received, and the end of the writing operation is determined based on a time when the separation event information is received.

In another aspect, an information processing system includes circuitry to receive contact event information indicating that an electronic pen comes into contact with a screen, move event information indicating that the electronic pen moves in a state of being in contact with the screen, separation event information indicating that the electronic pen detaches from the screen, and button pressing information indicating that a button of the electronic pen is pressed, and invalidate an instruction according to the button pressing information during a writing operation period from a start of a writing operation using the electronic pen to an end of the writing operation. The start of the writing operation is determined based on a time when the move event information is received, and the end of the writing operation is determined based on a time when the separation event information is received.

In another aspect, an information processing method includes receiving contact event information indicating that an electronic pen comes into contact with a screen, move event information indicating that the electronic pen moves in a state of being in contact with the screen, separation event information indicating that the electronic pen detaches from the screen, and button pressing information indicating that a button of the electronic pen is pressed, and invalidating an instruction according to the button pressing information during a writing operation period from a start of a writing operation using the electronic pen to an end of the writing operation. The start of the writing operation is determined based on a time when the move event information is received, and the end of the writing operation is determined based on a time when the separation event information is received.

In another aspect, a non-transitory recording medium storing a plurality of program codes which, when executed by one or more processors, causes the one or more processors to perform the method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 9 is a flowchart of the processing of writing according to embodiments of the present disclosure;

FIG. 10 is a diagram illustrating the first case of a writing operation according to embodiments of the present disclosure;

FIG. 11 is a diagram illustrating the second case of a writing operation according to embodiments of the present disclosure;

FIG. 12 is a diagram illustrating an electronic pen according to embodiments of the present disclosure.

Figure 1:
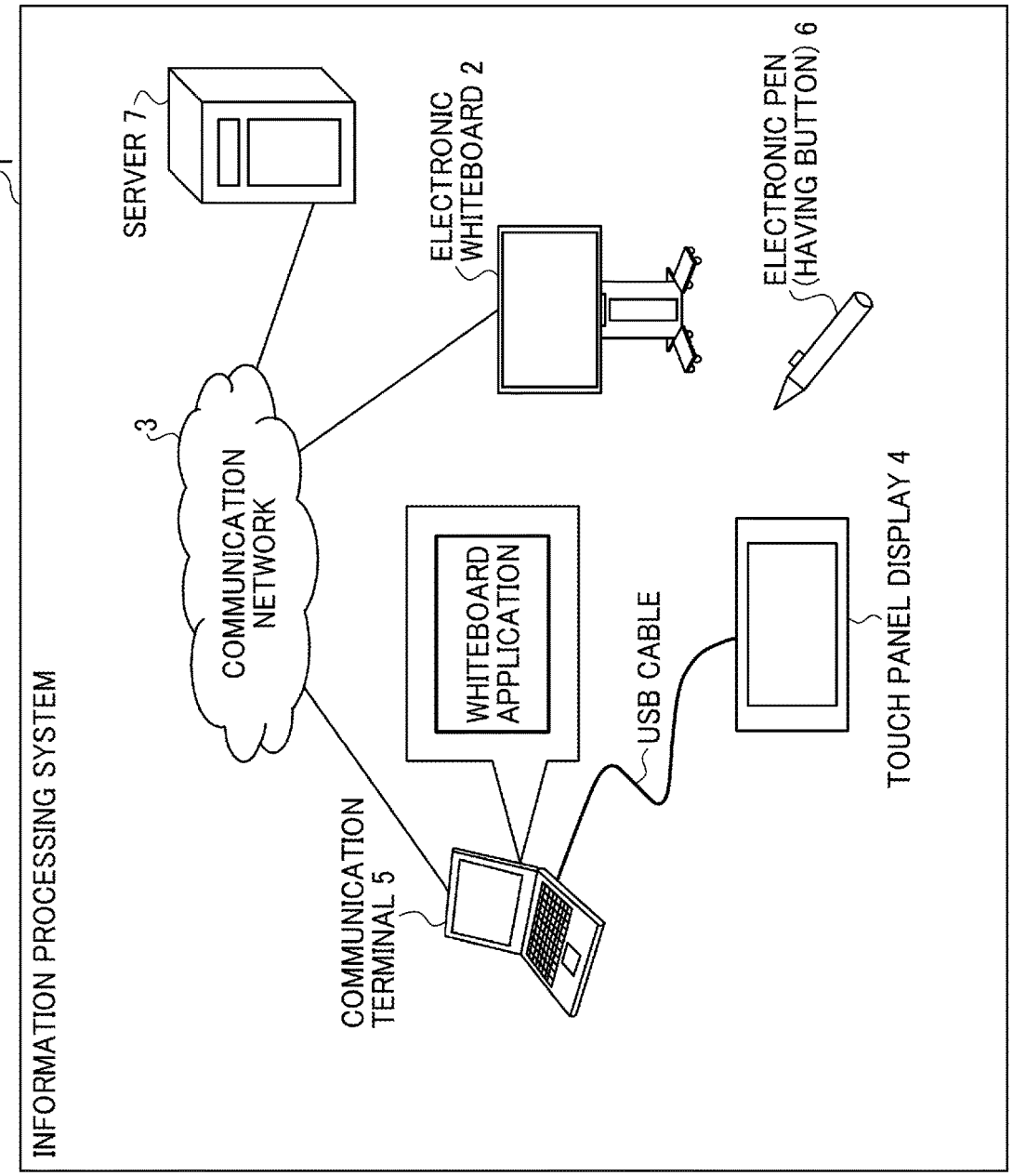
FIG. 1 is a schematic diagram illustrating an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An information processing apparatus, an information processing system, an information processing method, and a non-transitory recording medium according to embodiments of the present disclosure are described in detail below with reference to the accompanying drawings.

System Overview

FIG. 1 is a schematic diagram illustrating an information processing system 1 according to embodiments of the present disclosure. The information processing system 1 includes, for example, an information processing apparatus such as a laptop personal computer connected to a communication network 3 such as the Internet and a server 7. The information processing apparatus is a single apparatus. Examples of the information processing apparatus include an electronic whiteboard 2, a communication terminal 5, and a tablet terminal, on each of which an electronic pen 6 is usable.

The communication terminal 5 is connected to a touch panel display 4 by, for example, a universal serial bus (USB) cable and receives information input via the touch panel display 4 by a writing operation using the electronic pen 6. Similarly, the electronic whiteboard 2 receives information input via the display of the electronic whiteboard 2 by a writing operation using the electronic pen 6. The writing operation is an operation of inputting information by moving, for example, the electronic pen 6 in a state where the electronic pen 6 is in contact with a display. The writing operation is not limited to an operation of writing a character, and may include, for example, an operation of inputting information by moving a mouse or using a function of a right click or a function of selection of the mouse.

In the communication terminal 5 and the electronic whiteboard 2, an application (whiteboard application) for writing or drawing using the electronic pen 6 is used. The whiteboard application operates, for example, in cooperation with a cloud service, and allows display contents to be shared between operators who use communication terminals 5 and electronic whiteboards 2 at different sites connected via the communication network 3 with each other. In the embodiments of the present disclosure, the communication terminal 5 and the electronic whiteboard 2 have equivalent functions, and the operations performed by the communication terminal 5 described below can be replaced with the operations performed by the electronic whiteboard 2.

In the whiteboard application, events relating to the operation of the electronic pen 6 include a contact event (down event) when the electronic pen 6 comes into contact with the screen of the touch panel display 4, a separation event (up event) when the electronic pen 6 detaches from the screen, and a move event (move event) when the electronic pen 6 moves in a state of being in contact with the screen. These events are transmitted from the electronic pen 6 to the communication terminal 5 as notification events. Alternatively, the notification events may be transmitted to the server 7 via the communication terminal 5, and the operations relating to the notification events may be executed by the server 7.

The electronic pen 6 includes a button that can be pressed. An operator can switch the mode (e.g., a marker mode, a stroke mode) in the whiteboard application by pressing the button or releasing the pressing of the button. The number of buttons of the electronic pen 6 may be one or more. The mode and how to use the button are described later in detail.

In the conventional technology, when the button of the electronic pen 6 is erroneously pressed or the pressing of the button is erroneously released during a writing operation using the electronic pen 6, the writing operation may be changed unintentionally by the operator. In the embodiments of the present disclosure, even when the communication terminal 5 receives information relating to the pressing of the button of the electronic pen 6 during the writing operation using the electronic pen 6, the communication terminal 5 invalidates the received information. Accordingly, the change which is not intended by the operator relating to the writing operation during the writing operation is prevented. In the present embodiments, "invalidating (to invalidate)" may include, for example, blocking reception, or receiving information but not operating according to the information.

The configuration of the information processing system 1 illustrated in FIG. 1 is given by way of example. The communication network 3 may include, for example, a section connected by mobile communication or wireless communication such as a wireless local area network (LAN). The number of communication terminals 5 and electronic whiteboards 2 may be any number of one or more.

Hardware Configuration of Information Processing Apparatus and Server

Figure 2:
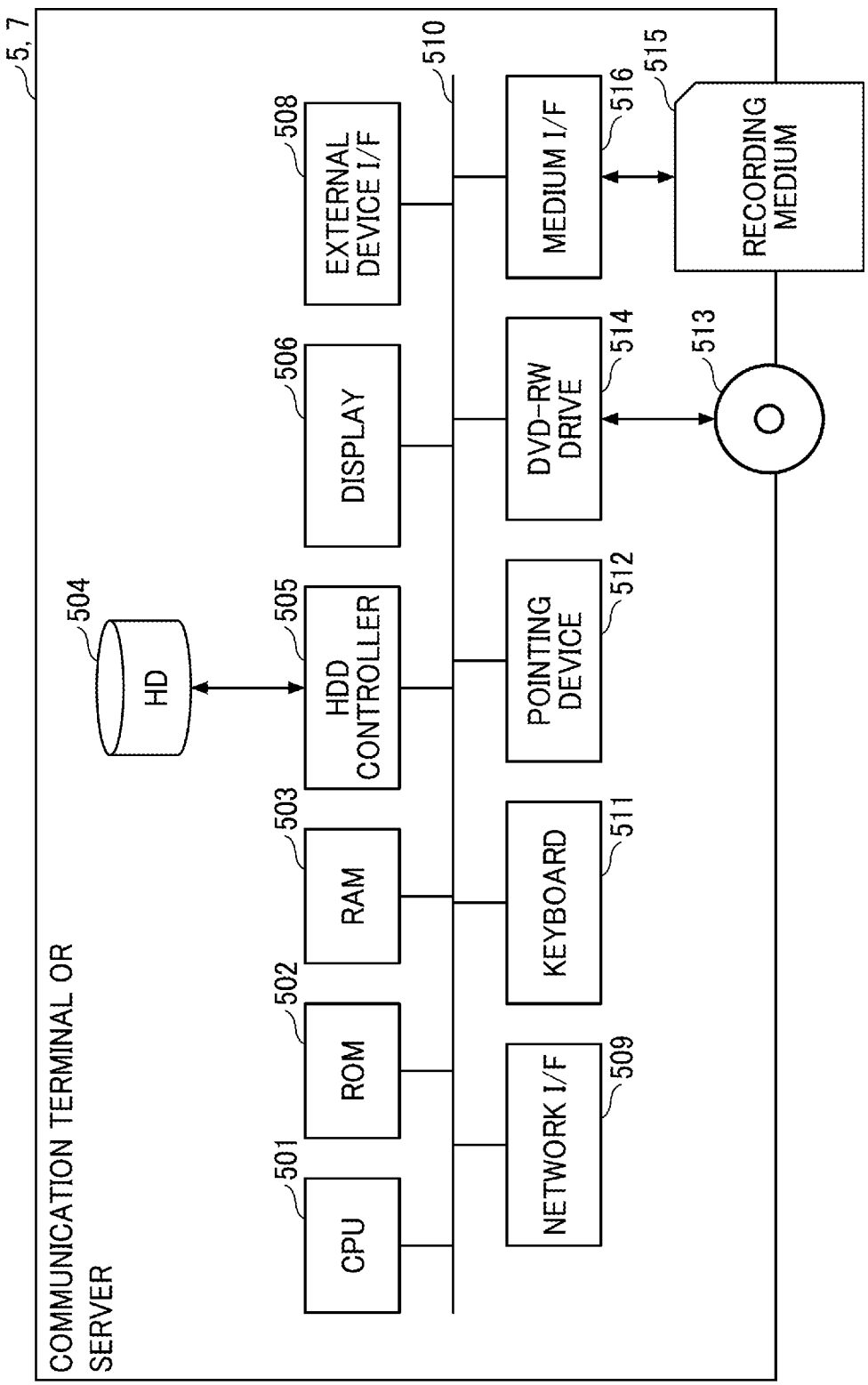
FIG. 2 is a block diagram illustrating a hardware configuration of a communication terminal or a sever according to embodiments of the present disclosure.

FIG. 2 is a block diagram illustrating a hardware configuration of the communication terminal 5 or the server 7 according to embodiments of the present disclosure. As illustrated in FIG. 2, each of the communication terminal 5 and the server 7 is implemented by a computer. The computer includes a central processing unit (CPU) 501, a read-only memory (ROM) 502, a random-access memory (RAM) 503, a hard disk (HD) 504, a hard disk drive (HDD) controller 505, a display 506, an external device interface (I/F) 508, a network interface (I/F) 509, a bus line 510, a keyboard 511, a pointing device 512, a digital versatile disc-rewritable (DVD-RW) drive 514, and a medium interface (I/F) 516.

The CPU 501 controls the entire operations of the communication terminal 5 and the server 7 to which the CPU 501 belongs. The ROM 502 stores a program such as an initial program loader (IPL) to boot the CPU 501. The RAM 503 is used as a work area for the CPU 501. The HD 504 stores various data such as a program. The HDD controller 505 controls the reading and writing of various data from and to the HD 504 under the control of the CPU 501. The display 506 displays various information such as a cursor, a menu, a window, characters, and images. The external device I/F 508 is an interface for connection with various external devices. Examples of the external devices include, but are not limited to, a USB memory and a printer. The network I/F 509 is an interface for data communication through the communication network 3. The bus line 510 is, for example, an address bus or a data bus, which electrically connects the components or elements such as the CPU 501 illustrated in FIG. 2 to each other.

The keyboard 511 serves as an input device provided with a plurality of keys used for, for example, inputting characters, numerical values, and various instructions. The pointing device 512 serves as an input device used for, for example, selecting or executing various instructions, selecting an object to be processed, and moving a cursor being displayed. The DVD-RW drive 514 controls the reading and writing of various data from and to a DVD-RW 513, which serves as a removable recording medium according to the present embodiments. The DVD-RW drive 514 is not limited to the DVD-RW, and may be, for example, a digital versatile disc-recordable (DVD-R). The medium I/F 516 controls the reading and writing (storing) of data from and to a recording medium 515 such as a flash memory.

Hardware Configuration of Electronic Whiteboard

Figure 3:
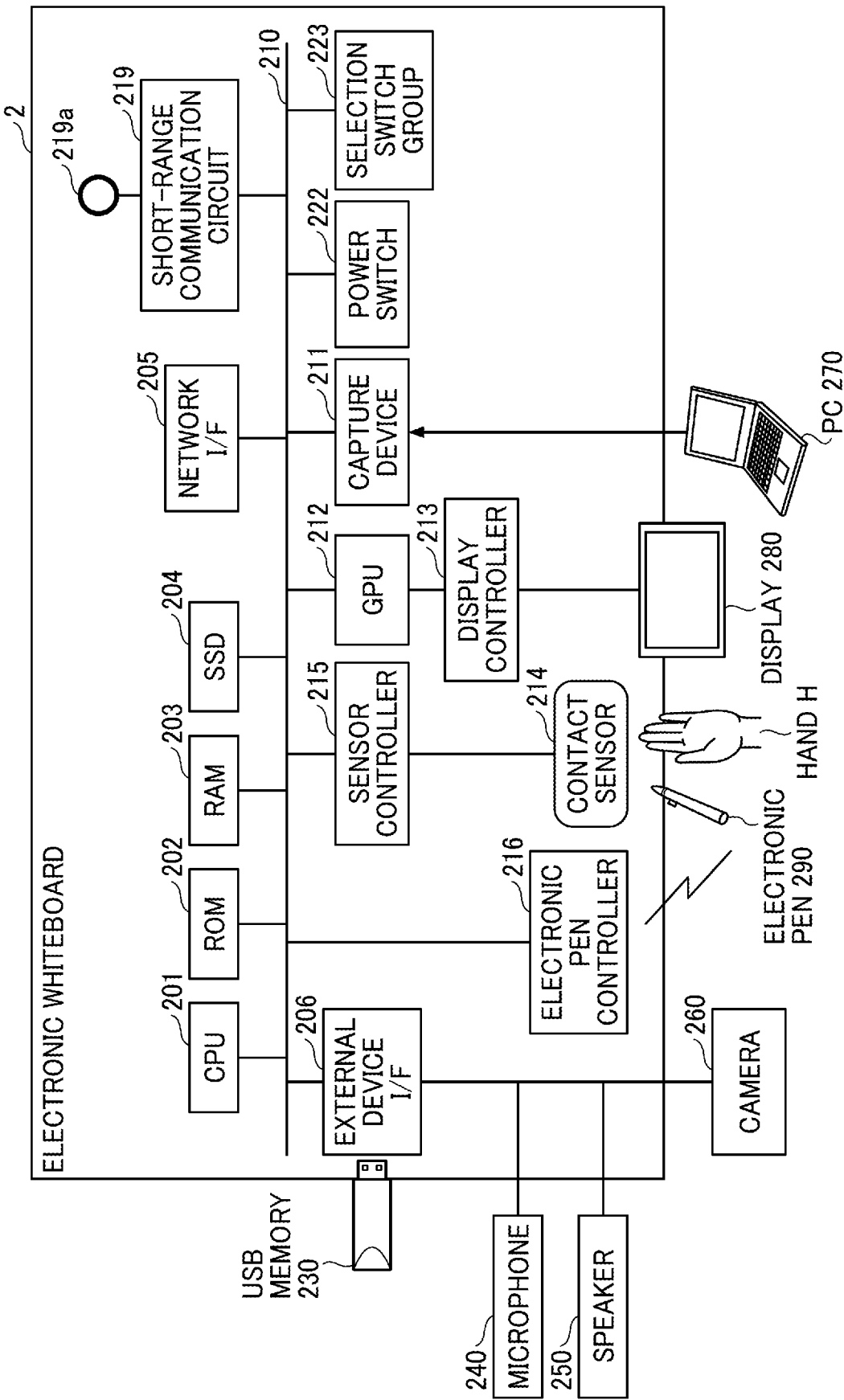
FIG. 3 is a block diagram illustrating a hardware configuration of an electronic whiteboard according to embodiments of the present disclosure.

FIG. 3 is a block diagram illustrating a hardware configuration of the electronic whiteboard 2 according to embodiments of the present disclosure. As illustrated in FIG. 3, the electronic whiteboard 2 includes a CPU 201, a ROM 202, a RAM 203, a solid-state drive (SSD) 204, a network I/F 205, and an external device I/F 206.

The CPU 201 controls the entire operation of the electronic whiteboard 2. The ROM 202 stores, for example, a program used by the CPU 201 and a program such as an IPL to boot the CPU 201. The RAM 203 is used as a work area for the CPU 201. The SSD 204 stores various data such as a program used for the electronic whiteboard 2. The network I/F 205 controls communication with an external device via the communication network 3. The external device I/F 206 is an interface for connection with various external devices. Examples of the external devices in this case include, but are not limited to, a USB memory 230 and external devices (a microphone 240, a speaker 250, and a camera 260).

The electronic whiteboard 2 further includes a capture device 211, a graphics processing unit (GPU) 212, a display controller 213, a contact sensor 214, a sensor controller 215, an electronic pen controller 216, a short-range communication circuit 219, an antenna 219*a* for the short-range communication circuit 219, a power switch 222, and a selection switch group 223.

The capture device 211 causes a display of an external personal computer (PC) 270 to display a still image or a moving image based on image data. The GPU 212 is a semiconductor chip dedicated to processing of a graphical image. The display controller 213 controls screen display to output an image output from the GPU 212 to, for example, a display 280. The contact sensor 214 detects contact onto the display 280 with, for example, an electronic pen 290 or a hand H of the operator. The sensor controller 215 controls the operation of the contact sensor 214. The contact sensor 214 detects input of coordinates and coordinates using an infrared blocking system. More specifically, for detecting the input of coordinates and the coordinates, the display 280 is provided with two light receiving and emitting devices disposed at both ends of the upper face of the display 280, and a reflector frame surrounding the periphery of the display 280. The light receiving and emitting devices emit a plurality of infrared rays in parallel to a surface of the display 280. The infrared rays are reflected by the reflector frame, and a light-receiving element receives light returning through the same optical path of the emitted infrared rays. The contact sensor 214 outputs, to the sensor controller 215, an identifier (ID) of an infrared ray that is blocked by an object after being emitted from the two light receiving and emitting devices. Based on the ID of the infrared ray, the sensor controller 215 specifies the coordinates of the position contacted by the object. The electronic pen controller 216 communicates with the electronic pen 290 to detect a touch by the tip or bottom of the electronic pen 290 to the display 280. The short-range communication circuit 219 is a communication circuit in compliance with, for example, the near field communication (NFC) or BLUETOOTH. The power switch 222 is a switch that turns on or off the power of the electronic whiteboard 2. The selection switch group 223 is, for example, a group of switches for adjusting the brightness and the hue of the display 280.

The electronic whiteboard 2 further includes a bus line 210. The bus line 210 is, for example, an address bus or a data bus, which electrically connects the components or elements such as the CPU 201 illustrated in FIG. 3 to each other.

The system of the contact sensor 214 is not limited to the infrared blocking system. The contact sensor 214 may include, as a detector, a capacitive touch panel that identifies a contact position by detecting a change in capacitance, a resistance film touch panel that identifies a contact position by detecting a change in voltage of two opposed resistance films, or an electromagnetic induction touch panel that identifies a contact position by detecting electromagnetic induction caused by the contact of an object to the display. In addition to or alternative to detecting a touch by the tip or bottom of the electronic pen 290, the electronic pen controller 216 may also detect a touch by another part of the electronic pen 290, such as a part held by a hand of the operator.

Functions

Figure 4:
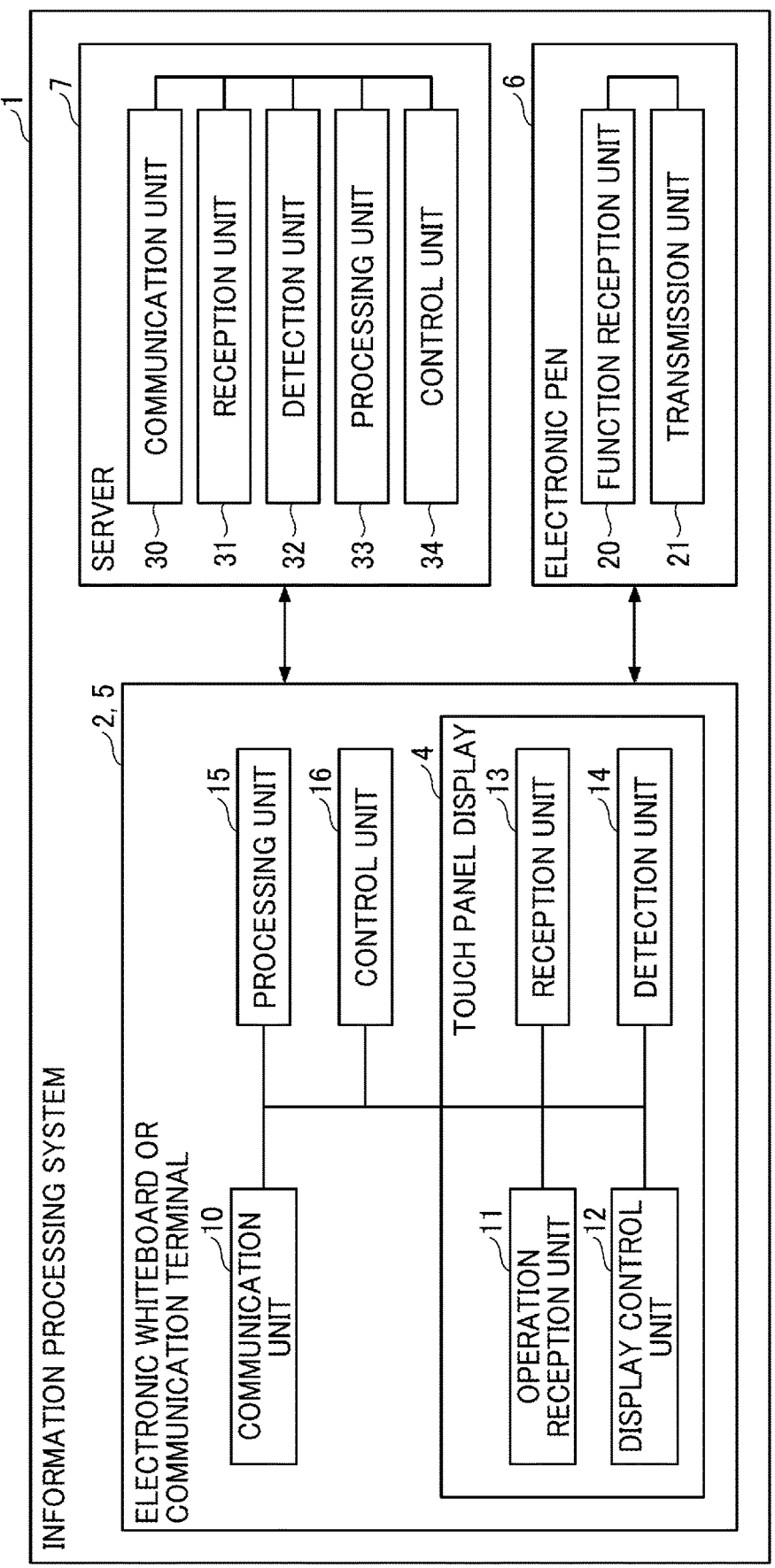
FIG. 4 is a block diagram illustrating a functional configuration of an information processing system according to embodiments of the present disclosure.

FIG. 4 is a block diagram illustrating a functional configuration of the information processing system 1 according to embodiments of the present disclosure. The communication terminal 5 or the electronic white board 2 includes a communication unit 10, an operation reception unit 11, a display control unit 12, a reception unit 13, a detection unit 14, a processing unit 15, and a control unit 16. These functional units provide functions implemented by the CPU 501 executing instructions included in one or more programs installed in the communication terminal 5 or the CPU 201 executing instructions included in one or more programs installed in the electronic whiteboard 2. The operation reception unit 11, the display control unit 12, the reception unit 13, and the detection unit 14 may be functions included in the touch panel display 4. The touch panel display 4 may be included in the communication terminal 5, or may be connected to the communication terminal 5 via, for example, a USB cable.

The communication unit 10 is a communication function that the communication terminal 5 or the electronic whiteboard 2 has, and transmits and receives information to and from, for example, the server 7 and a cloud service via the communication network 3.

The operation reception unit 11 receives operations such as inputting characters and pressing buttons operated by the operator via the keyboard 511 or the pointing device 512 of the communication terminal 5 or the contact sensor 214 of the electronic whiteboard 2.

The display control unit 12 displays, for example, a screen of the whiteboard application on the display 506 of the communication terminal 5 or the display 208 of the electronic whiteboard 2.

The reception unit 13 receives, from a transmission unit 21 of the electronic pen 6, event information relating to the operation of the electronic pen 6, such as a contact event (down event) when the electronic pen 6 comes into contact with the screen of the touch panel display 4, a separation event (up event) when the electronic pen 6 detaches from the screen, and a move event (move event) when the electronic pen 6 moves in a state of being in contact with the screen. The reception unit 13 receives, from the transmission unit 21 of the electronic pen 6, pressing information relating to pressing of the button (information relating to the pressing of the button and the release of the pressing of the button) of the electronic pen 6. The pressing information may be included in the event information relating to the operation of the electronic pen 6.

The detection unit 14 detects the pressing information relating to the pressing of the button (whether the button is pressed) of the electronic pen 6, which is included in the event information received by the reception unit 13.

The processing unit 15 executes processes relating to determination whether to invalidate the pressing information relating to the pressing of the button (whether the button is pressed) of the electronic pen 6, or whether to invalidate the change relating to the writing operation according to the pressing information. The details of the method of the processes are described later.

The control unit 16 switches, for example, the mode of the writing operation using the electronic pen 6. For example, the control unit 16 switches the mode relating to the operation of the electronic pen 6 to the marker mode, and the writing operation using the electronic pen 6 starts in the marker mode. Alternatively, the control unit 16 switches the mode relating to the operation of the electronic pen 6 to the stroke mode, and the writing operation using the electronic pen 6 starts in the stroke mode.

The electronic pen 6 includes a function reception unit 20 and a transmission unit 21. These units are functions or devices implemented by, for example, hardware mounted on the electronic pen 6.

The function reception unit 20 receives event information relating to the operation of the electronic pen 6 and the pressing of the button of the electronic pen 6.

The transmission unit 21 transmits the event information relating to the operation of the electronic pen 6 and the information relating to the pressing of the button of the electronic pen 6 received by the function reception unit 20 to the reception unit 13 of the communication terminal 5 or the reception unit 13 of the electronic whiteboard 2.

The server 7 includes a communication unit 30, a reception unit 31, a detection unit 32, a processing unit 33, and a control unit 34. These functional units provide functions implemented by the CPU 501 executing instructions included in one or more programs installed in the server 7.

The communication unit 30 is a communication function that the server 7 has, and transmits and receives information to and from, for example, the communication terminal 5 and a cloud service via the communication network 3.

The reception unit 31, the detection unit 32, the processing unit 33, and the control unit 34 have functions equivalent to those of the reception unit 13, the detection unit 14, the processing unit 15, and the control unit 16 of the communication terminal 5, respectively. The server 7 may include only some of these functional units.

Screen of Whiteboard Application

Figure 5:
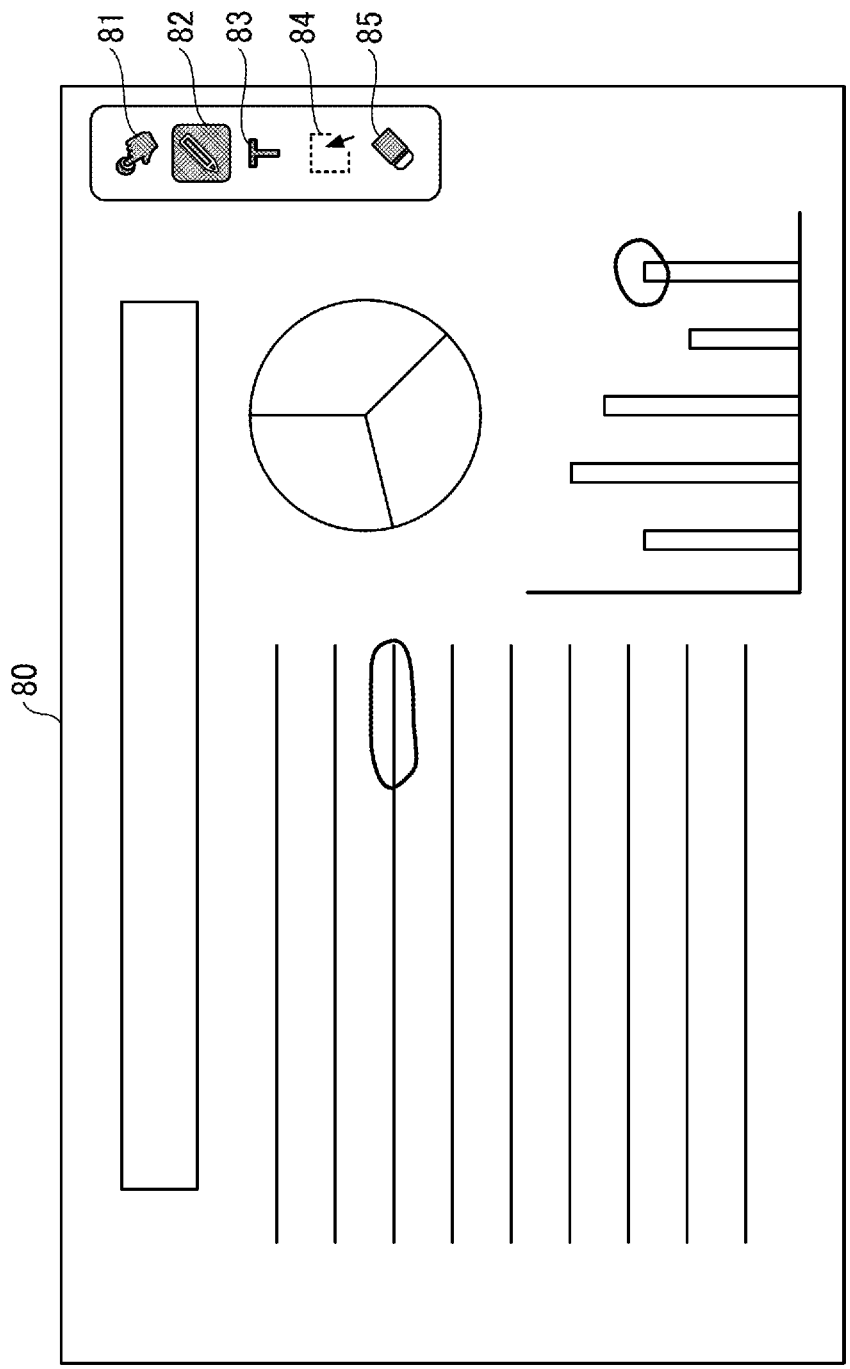
FIG. 5 is a diagram illustrating a screen of a whiteboard application according to embodiments of the present disclosure.

FIG. 5 is a diagram illustrating a screen of the whiteboard application according to embodiments of the present disclosure. As illustrated in FIG. 5, an application screen 80 includes a marker mode button 81, a stroke mode button 82, a character input mode button 83, a selection move mode button 84, and an erase mode button 85. By pressing these buttons, the mode of operation on the whiteboard application can be selected.

The marker mode button 81 is a button that, when pressed, switches the mode relating to the operation of the electronic pen 6 to the marker mode. The marker mode is a mode in which a stroke input by the electronic pen 6 is erased in a certain period of time.

The stroke mode button 82 is a button that, when pressed, switches the mode relating to the operation of the electronic pen 6 to the stroke mode. The stroke mode is a mode in which a stroke input by the electronic pen 6 is held without being erased.

The character input mode button 83 is a button that, when pressed, switches the mode relating to the operation of the electronic pen 6 to a character input mode. The character input mode is a mode in which, for example, a stroke input by the electronic pen 6 is recognized as a character and the recognized character is displayed.

The selection move mode button 84 is a button that, when pressed, switches the mode relating to the operation of the electronic pen 6 to a selection move mode. The selection move mode is a mode in which an object is selected and moved by the electronic pen 6.

The erase mode button 85 is a button that, when pressed, switches the mode relating to the operation of the electronic pen 6 to an erase mode. The erasing mode is a mode in which the stroke input by the electronic pen 6 is specified and erased.

Operation according to Pressing of Button of Electronic Pen

To the button of the electronic pen 6, for example, a setting relating to the writing operation using the electronic pen 6 can be assigned. For example, each mode relating to the operation of the electronic pen 6 described with reference to FIG. 5 can be assigned to the button of the electronic pen 6. For example, the operation of the electronic pen 6 when the button is pressed can be set such that the electronic pen 6 operates in the stroke mode when the button is not pressed, and operates in the marker mode when a specific button is held down. In the following description, it is assumed that the operation when the button of the electronic pen 6 is pressed is set to the marker mode as described above.

Notification Event Transmitted from Electronic Pen

The events relating to the operation of the electronic pen 6 include the contact event (down event) when the electronic pen 6 comes into contact with the screen of the touch panel display 4, the separation event (up event) when the electronic pen 6 detaches from the screen, and the move event (move event) when the electronic pen 6 moves in a state of being in contact with the screen. The transmission unit 21 of the electronic pen 6 transmits these events as information on a notification event to the reception unit 13 of the communication terminal 5 together with the pressing information on determination whether the button is pressed.

In the present embodiments, the method (timing and conditions) for transmitting the information on the notification event may vary depending on the implementation of the electronic pen 6. In the following description, three cases are described in which different notification events occur according to the operations when the button of the electronic pen 6 is pressed or the pressing of the button is released during the writing operation using the electronic pen 6.

First Case of Occurrence of Notification Events

Figure 6:
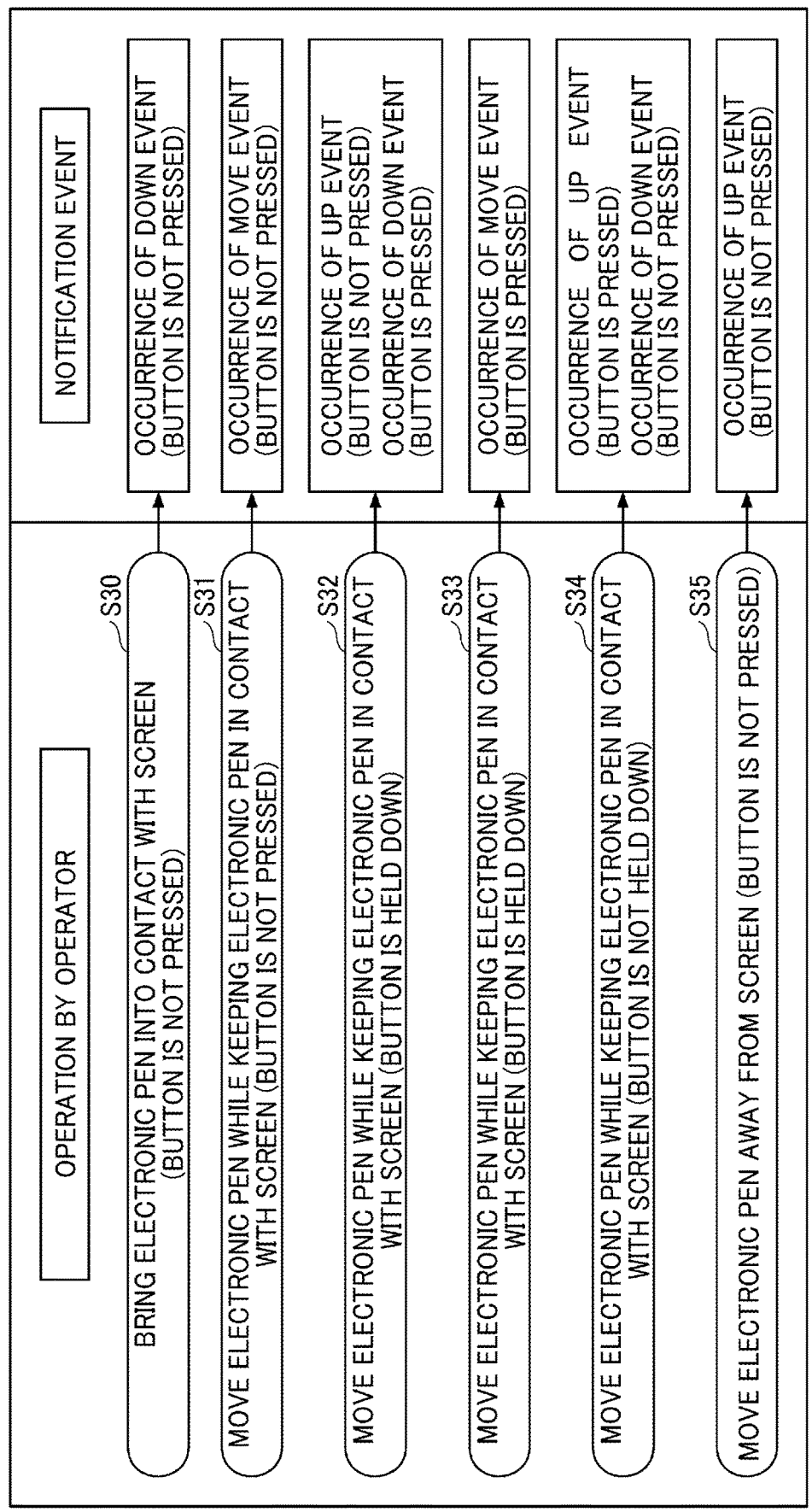
FIG. 6 is a diagram illustrating the first case of occurrence of notification events according to embodiments of the present disclosure.

FIG. 6 is a diagram illustrating the first case of occurrence of the notification events according to embodiments of the present disclosure. The steps in the processing illustrated in FIG. 6 are described below.

Step S30: The operator brings the electronic pen 6 into contact with the screen of the touch panel display 4 in a state where the button of the electronic pen 6 is not pressed. The function reception unit 20 of the electronic pen 6 receives event information of a down event (in the state where the button is not pressed).

The transmission unit 21 of the electronic pen 6 transmits the received event information to the reception unit 13 of the communication terminal 5. The reception unit 13 of the communication terminal 5 receives the event information of the down event (in the state where the button is not pressed) from the transmission unit 21 of the electronic pen 6.

Step S31: The operator moves the electronic pen 6 while keeping the electronic pen 6 in contact with the screen in a state where the button is not pressed.

The function reception unit 20 of the electronic pen 6 receives event information of a move event (in the state where the button is not pressed). The transmission unit 21 of the electronic pen 6 transmits the received event information to the reception unit 13 of the communication terminal 5. The reception unit 13 of the communication terminal 5 receives the event information of the move event (in the state where the button is not pressed) from the transmission unit 21 of the electronic pen 6.

Step S32: The operator moves the electronic pen 6 while keeping the electronic pen 6 in contact with the screen in a state where the button is held down.

The function reception unit 20 of the electronic pen 6 receives event information of an up event (in the state where the button is not pressed). The transmission unit 21 of the electronic pen 6 transmits the received event information to the reception unit 13 of the communication terminal 5. The reception unit 13 of the communication terminal 5 receives the event information of the up event (in the state where the button is not pressed) from the transmission unit 21 of the electronic pen 6.

Further, the function reception unit 20 of the electronic pen 6 receives event information of a down event (in the state where the button is pressed). The transmission unit 21 of the electronic pen 6 transmits the received event information to the reception unit 13 of the communication terminal 5. The reception unit 13 of the communication terminal 5 receives the event information of the down event (in the state where the button is pressed) from the transmission unit 21 of the electronic pen 6.

In other words, when the button of the electronic pen 6 is pressed during the writing operation using the electronic pen 6, an up event and a down event occur. This means that the writing operation is completed once.

Step S33: The operator moves the electronic pen 6 while keeping the electronic pen 6 in contact with the screen in a state where the button is held down.

The function reception unit 20 of the electronic pen 6 receives event information of a move event (in the state where the button is pressed). The transmission unit 21 of the electronic pen 6 transmits the received event information to the reception unit 13 of the communication terminal 5. The reception unit 13 of the communication terminal 5 receives the event information of the move event (in the state where the button is pressed) from the transmission unit 21 of the electronic pen 6.

Step S34: The operator moves the electronic pen 6 while keeping the electronic pen 6 in contact with the screen in a state where the button is not held down.

The function reception unit 20 of the electronic pen 6 receives event information of an up event (in the state where the button is pressed). The transmission unit 21 of the electronic pen 6 transmits the received event information to the reception unit 13 of the communication terminal 5. The reception unit 13 of the communication terminal 5 receives the event information of the up event (in the state where the button is pressed) from the transmission unit 21 of the electronic pen 6.

Further, the function reception unit 20 of the electronic pen 6 receives event information of a down event (in the state where the button is not pressed). The transmission unit 21 of the electronic pen 6 transmits the received event information to the reception unit 13 of the communication terminal 5. The reception unit 13 of the communication terminal 5 receives the event information of the down event (in the state where the button is not pressed) from the transmission unit 21 of the electronic pen 6.

In other words, when the pressing of the button of the electronic pen 6 is released during the writing operation using the electronic pen 6, an up event and a down event occur. This means that the writing operation is completed once.

Step S35: The operator moves the electronic pen 6 away from the screen in a state where the button is not pressed. The function reception unit 20 of the electronic pen 6 receives event information of an up event (in the state where the button is not pressed).

The transmission unit 21 of the electronic pen 6 transmits the received event information to the reception unit 13 of the communication terminal 5. The reception unit 13 of the communication terminal 5 receives the event information of the up event (in the state where the button is not pressed) from the transmission unit 21 of the electronic pen 6.

As described above, the electronic pen in the first case operates in such a way that the writing operation is completed once because an up event and a down event occur when the button of the electronic pen 6 is pressed or the pressing of the button is released during writing.

Second Case of Occurrence of Notification Events

Figure 7:
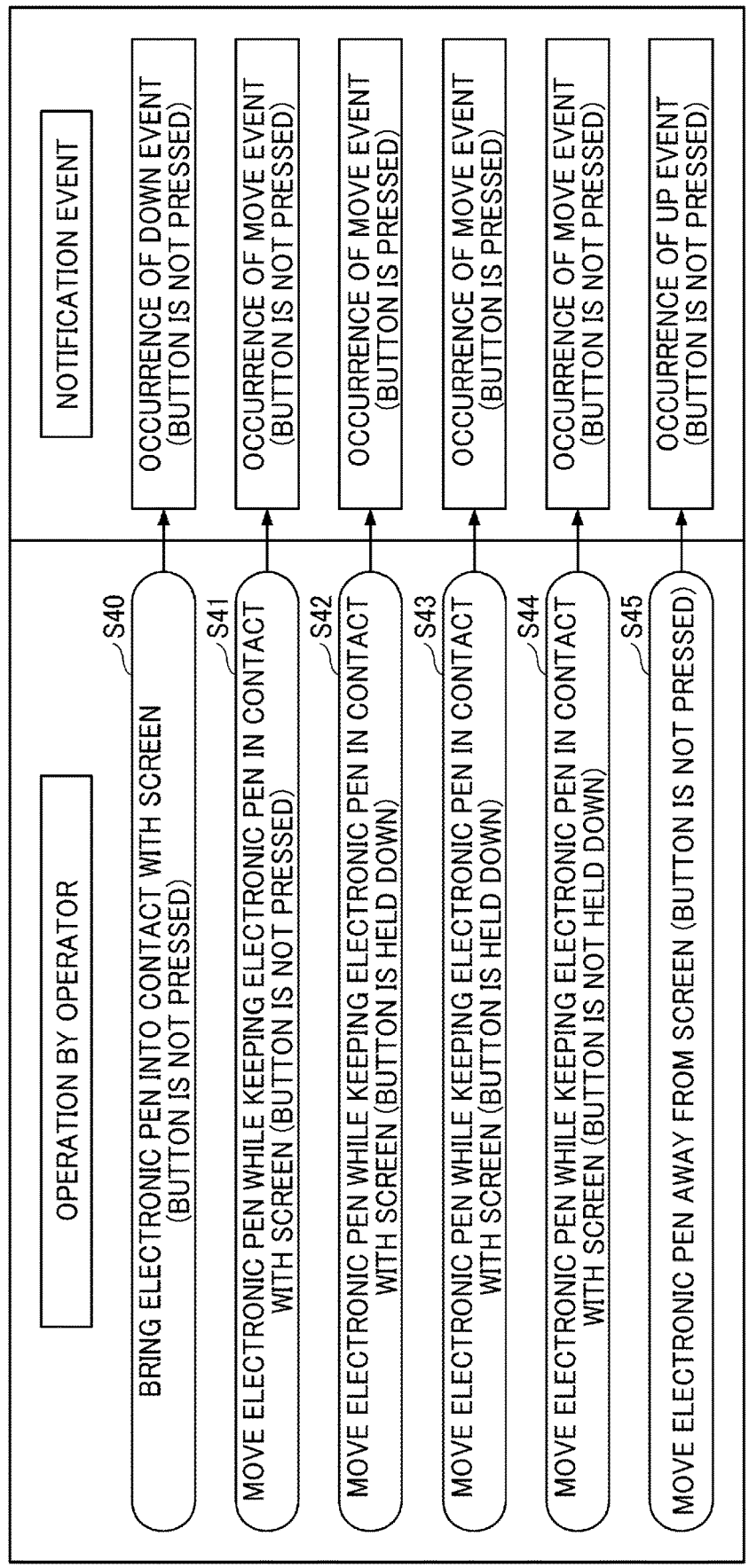
FIG. 7 is a diagram illustrating the second case of occurrence of notification events according to embodiments of the present disclosure.

FIG. 7 is a diagram illustrating the second case of occurrence of the notification events according to embodiments of the present disclosure. The steps in the processing illustrated in FIG. 7 are described below.

Step S40: The operator brings the electronic pen 6 into contact with the screen of the touch panel display 4 in a state where the button of the electronic pen 6 is not pressed. The function reception unit 20 of the electronic pen 6 receives event information of a down event (in the state where the button is not pressed).

The transmission unit 21 of the electronic pen 6 transmits the received event information to the reception unit 13 of the communication terminal 5. The reception unit 13 of the communication terminal 5 receives the event information of the down event (in the state where the button is not pressed) from the transmission unit 21 of the electronic pen 6.

Step S41: The operator moves the electronic pen 6 while keeping the electronic pen 6 in contact with the screen in a state where the button is not pressed.

The function reception unit 20 of the electronic pen 6 receives event information of a move event (in the state where the button is not pressed). The transmission unit 21 of the electronic pen 6 transmits the received event information to the reception unit 13 of the communication terminal 5. The reception unit 13 of the communication terminal 5 receives the event information of the move event (in the state where the button is not pressed) from the transmission unit 21 of the electronic pen 6.

Step S42: The operator moves the electronic pen 6 while keeping the electronic pen 6 in contact with the screen in a state where the button is held down.

The function reception unit 20 of the electronic pen 6 receives event information of a move event (in the state where the button is pressed). The transmission unit 21 of the electronic pen 6 transmits the received event information to the reception unit 13 of the communication terminal 5. The reception unit 13 of the communication terminal 5 receives the event information of the move event (in the state where the button is pressed) from the transmission unit 21 of the electronic pen 6.

In other words, when the button of the electronic pen 6 is pressed during the writing operation using the electronic pen 6, the state of the button is switched from the state where the button is not pressed to the state where the button is pressed.

Step S43: The operator moves the electronic pen 6 while keeping the electronic pen 6 in contact with the screen in a state where the button is held down.

The function reception unit 20 of the electronic pen 6 receives event information of a move event (in the state where the button is pressed). The transmission unit 21 of the electronic pen 6 transmits the received event information to the reception unit 13 of the communication terminal 5. The reception unit 13 of the communication terminal 5 receives the event information of the move event (in the state where the button is pressed) from the transmission unit 21 of the electronic pen 6.

Step S44: The operator moves the electronic pen 6 while keeping the electronic pen 6 in contact with the screen in a state where the button is not held down.

The function reception unit 20 of the electronic pen 6 receives event information of a move event (in the state where the button is not pressed). The transmission unit 21 of the electronic pen 6 transmits the received event information to the reception unit 13 of the communication terminal 5. The reception unit 13 of the communication terminal 5 receives the event information of the up event (in the state where the button is not pressed) from the transmission unit 21 of the electronic pen 6.

In other words, when the pressing of the button of the electronic pen 6 is released during the writing operation using the electronic pen 6, the state of the button is switched from the state where the button is pressed to the state where the button is not pressed.

Step S45: The operator moves the electronic pen 6 away from the screen in a state where the button is not pressed. The function reception unit 20 of the electronic pen 6 receives event information of an up event (in the state where the button is not pressed).

The transmission unit 21 of the electronic pen 6 transmits the received event information to the reception unit 13 of the communication terminal 5. The reception unit 13 of the communication terminal 5 receives the event information of the up event (in the state where the button is not pressed) from the transmission unit 21 of the electronic pen 6.

As described above, the electronic pen in the second case operates such that the state of the button is switched between the state where the button is pressed and the state where the button is not pressed when the button of the electronic pen 6 is pressed or the pressing of the button is released during writing.

Third Case of Occurrence of Notification Events

Figure 8:
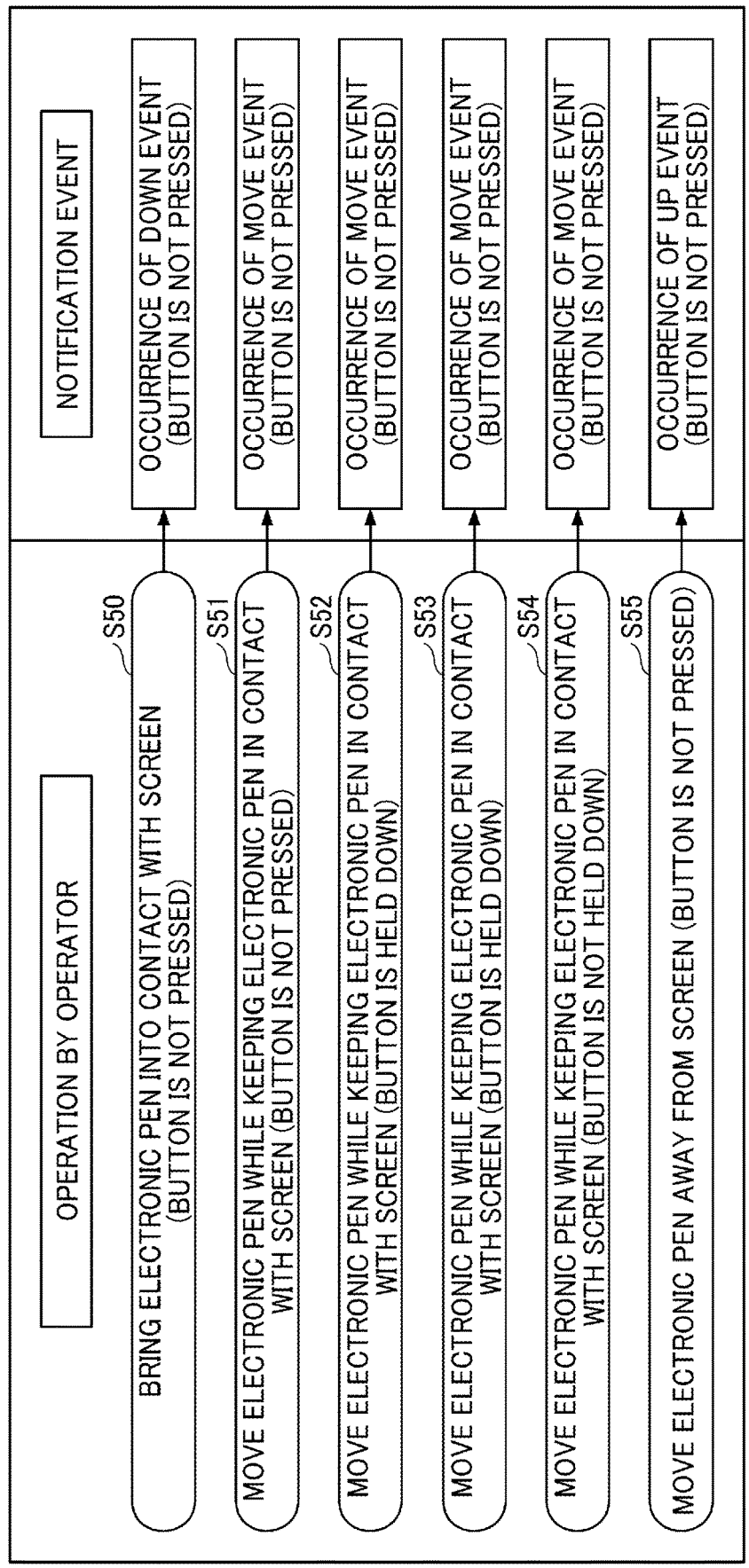
FIG. 8 is a diagram illustrating the third case of occurrence of notification events according to embodiments of the present disclosure.

FIG. 8 is a diagram illustrating the third case of occurrence of the notification events according to embodiments of the present disclosure. The steps in the processing illustrated in FIG. 8 are described below.

Step S50: The operator brings the electronic pen 6 into contact with the screen of the touch panel display 4 in a state where the button of the electronic pen 6 is not pressed. The function reception unit 20 of the electronic pen 6 receives event information of a down event (in the state where the button is not pressed).

The transmission unit 21 of the electronic pen 6 transmits the received event information to the reception unit 13 of the communication terminal 5. The reception unit 13 of the communication terminal 5 receives the event information of the down event (in the state where the button is not pressed) from the transmission unit 21 of the electronic pen 6.

Step S51: The operator moves the electronic pen 6 while keeping the electronic pen 6 in contact with the screen in a state where the button is not pressed.

The function reception unit 20 of the electronic pen 6 receives event information of a move event (in the state where the button is not pressed). The transmission unit 21 of the electronic pen 6 transmits the received event information to the reception unit 13 of the communication terminal 5. The reception unit 13 of the communication terminal 5 receives the event information of the move event (in the state where the button is not pressed) from the transmission unit 21 of the electronic pen 6.

Step S52: The operator moves the electronic pen 6 while keeping the electronic pen 6 in contact with the screen in a state where the button is held down.

The function reception unit 20 of the electronic pen 6 receives event information of a move event (in the state where the button is not pressed). The transmission unit 21 of the electronic pen 6 transmits the received event information to the reception unit 13 of the communication terminal 5. The reception unit 13 of the communication terminal 5 receives the event information of the move event (in the state where the button is not pressed) from the transmission unit 21 of the electronic pen 6.

In other words, even when the button of the electronic pen 6 is pressed during the writing operation using the electronic pen 6, the event in the state where the button is pressed is not notified.

Step S53: The operator moves the electronic pen 6 while keeping the electronic pen 6 in contact with the screen in a state where the button is held down.

The function reception unit 20 of the electronic pen 6 receives event information of a move event (in the state where the button is not pressed). The transmission unit 21 of the electronic pen 6 transmits the received event information to the reception unit 13 of the communication terminal 5. The reception unit 13 of the communication terminal 5 receives the event information of the move event (in the state where the button is not pressed) from the transmission unit 21 of the electronic pen 6.

Step S54: The operator moves the electronic pen 6 while keeping the electronic pen 6 in contact with the screen in a state where the button is not held down.

The function reception unit 20 of the electronic pen 6 receives event information of a move event (in the state where the button is not pressed). The transmission unit 21 of the electronic pen 6 transmits the received event information to the reception unit 13 of the communication terminal 5. The reception unit 13 of the communication terminal 5 receives the event information of the up event (in the state where the button is not pressed) from the transmission unit 21 of the electronic pen 6.

In other words, even when the pressing of the button of the electronic pen 6 is released during the writing operation using the electronic pen 6, the event in the state where the button is not pressed is not notified.

Step S55: The operator moves the electronic pen 6 away from the screen in a state where the button is not pressed. The function reception unit 20 of the electronic pen 6 receives event information of an up event (in the state where the button is not pressed).

The transmission unit 21 of the electronic pen 6 transmits the received event information to the reception unit 13 of the communication terminal 5. The reception unit 13 of the communication terminal 5 receives the event information of the up event (in the state where the button is not pressed) from the transmission unit 21 of the electronic pen 6.

As described above, the electronic pen in the third case does not generate an event in which the state of the button is switched between the state where the button is pressed and the state where the button is not pressed even when the button of the electronic pen 6 is pressed or the pressing of the button is released during writing.

Processing of Writing

FIG. 9 is a flowchart of the processing of writing according to embodiments of the present disclosure. The steps in the processing illustrated in FIG. 9 are described below.

Step S70: In the case where the reception unit 13 of the communication terminal 5 receives event information of a down event from the transmission unit 21 of the electronic pen 6, the processing proceeds to step S71. Otherwise, the reception unit 13 maintains a state of receiving event information until event information of a down event is received.

Step S71: In the case where the detection unit 14 of the communication terminal 5 detects that the button for switching to the marker mode is pressed in the event information of the down event received by the reception unit 13 in step S70, the processing proceeds to step S72. Otherwise, the processing proceeds to step S73.

Step S72: The control unit 16 of the communication terminal 5 switches the mode relating to the operation of the electronic pen 6 to the marker mode, and the writing operation using the electronic pen 6 starts in the marker mode.

Step S73: The control unit 16 of the communication terminal 5 switches the mode relating to the operation of the electronic pen 6 to the stroke mode, and the writing operation using the electronic pen 6 starts in the stroke mode.

Step S74: In the case where the reception unit 13 of the communication terminal 5 receives event information of a move event from the transmission unit 21 of the electronic pen 6, the processing proceeds to step S75. Otherwise, the reception unit 13 maintains a state of receiving event information until event information of a move event is received.

Step S75: The processing unit 15 of the communication terminal 5 ignores the information on the pressing of the button included in the event information of the move event received by the reception unit 13 in step S74 and executes a writing process. In this way, the mode of the electronic pen 6 that performs the operations illustrated in FIG. 7 is prevented from being changed according to the pressing of the button of the electronic pen or the releasing of the pressing of the button during the writing operation.

Step S76: In the case where the reception unit 13 of the communication terminal 5 receives event information of an up event from the transmission unit 21 of the electronic pen 6, the processing proceeds to step S77. Otherwise, the processing proceeds to step S74.

Step S77: In the case where the reception unit 13 of the communication terminal 5 receives event information of a down event from the transmission unit 21 of the electronic pen 6 within a predetermined period of time after receiving the event information of the up event in Step S76, the processing proceeds to step S78. Otherwise, the processing of writing ends. In the present embodiments, when the processing proceeds to step S78, it is assumed that the operation operated by the operator and the notification event in step S32 of FIG. 6 have occurred.

Step S78: The processing unit 15 of the communication terminal 5 ignores the event information of the down event received by the reception unit 13 in step S77 and executes a writing process. In this way, the mode of the electronic pen 6 that performs the operations illustrated in FIG. 6 is prevented from being changed according to the pressing of the button of the electronic pen or the releasing of the pressing of the button during the writing operation.

As described above, in the information processing system 1, the mode of the writing operation is prevented from being changed according to the pressing of the button of the electronic pen or the releasing of the pressing of the button during the writing operation.

For this purpose, the information processing system 1 receives contact event information indicating that the electronic pen comes into contact with a screen, move event information indicating that the electronic pen moves in a state of being in contact with the screen, separation event information indicating that the electronic pen detaches from the screen, and button pressing information indicating determination whether the button of the electronic pen is pressed. Further, during a writing operation period (steps S74 to S76 in FIG. 9) from the reception of the move event information indicating the start of the writing operation using the electronic pen to the reception of the separation event information indicating the end of the writing operation, the information processing system 1 executes a process to invalidate the change relating to the writing operation according to the received button pressing information.

In addition, in the case where the contact event information is received within the predetermined period of time (in step S77 of FIG. 9) after the separation event information is received during the writing operation period, the information processing system 1 invalidates the received separation event information and contact event information, and executes a process to continue the writing operation.

Furthermore, the information processing system 1 may include a period in the writing operation period, which is the period (from steps S71 to S73 of FIG. 9) before the writing operation period, from the reception of the contact event information to the reception of the move event information indicating the start of the writing operation, and execute the processing during the writing operation period including the period similarly as the processing during the writing operation period.

Cases of Writing Operation

The case of the conventional writing operation that does not include the writing processes according to the flowchart illustrated in FIG. 9 is assumed. When the electronic pen 6 that performs the operations illustrated in FIG. 6 is used, the writing is performed in the mode that is switched according to pressing or not pressing (releasing the pressing of) the button for switching the mode after the electronic pen 6 is brought into contact with the screen. FIG. 10 is a diagram illustrating the first case of the writing operation according to embodiments of the present disclosure. In the writing operation described in the present embodiment, it is assumed that the pressing of the button for switching to the marker mode is not detected in step S71 of FIG. 9, and writing in the stroke mode is started in step S72. As illustrated in FIG. 10, the writing is performed in the stroke mode in a section 90 in which the button is not pressed. In a section 91 in which the button is pressed after the section 90, the writing is performed in the marker mode switched from the stroke mode. In a section 92 in which the button is not pressed, the writing is performed again in the stroke mode switched from the marker mode.

On the other hands, the case of the writing operation that includes the writing processes according to the flowchart illustrated in FIG. 9 is assumed. When the electronic pen 6 that performs the operations illustrated in FIG. 7 or 8 is used, the mode is not switched even when the button for switching the mode is pressed or the pressing of the button for switching the mode is released after the electronic pen 6 is brought into contact with the screen. FIG. 11 is a diagram illustrating the second case of the writing operation according to embodiments of the present disclosure. As illustrated in FIG. 11, first, the writing is performed in the stroke mode in a section 93 in which the button is not pressed. Even in a section 94 in which the button is pressed after the section 93, the writing is performed in the marker mode staying with the same mode. In a section 95 in which the button is not pressed, the writing is performed again in the stroke mode.

Electronic Pen

FIG. 12 is a diagram illustrating the electronic pen 6 according to embodiments of the present disclosure. As illustrated in FIG. 12, the electronic pen 6 includes, for example, a button 100 and an indicator 101. The button 100 may include, for example, a button having a function equivalent to a right click of a mouse and/or a function of selecting an item (for example, selecting an item displayed on a screen). Example functions of the right click of the mouse include, but not limited to, displaying a menu containing additional options. The electronic pen 6 may include a plurality of buttons. The indicator 101 may indicate the state of the electronic pen 6 by, for example, the lighting state (e.g., constantly lighting, blinking, color of lighting) of a light-emitting diode (LED). For example, the indicator 101 may indicate that the electronic pen 6 is ready for use when the indicator is in a white light state, and may indicate that the battery of the electronic pen 6 needs to be replaced when the indicator is in a red light state. Alternatively, the lighting state of indicator 101 may indicate a state of the operation of the electronic pen 6 or an event relating to the operation (such as a contact event, a separation event, and a move event).

As an example of the operation of the electronic pen 6, when "clicking or selecting" is performed, an item is tapped with the electronic pen 6. When "right-clicking" is performed, the item is tapped with the electronic pen 6 while the button 100 is held down. When "dragging and dropping" are performed, the electronic pen 6 is placed on the item, and the electronic pen 6 is held until the circle around the pointer of the electronic pen 6 is completed. Then, the item is moved to a desired position while the electronic pen 6 is kept placed on the item. When "selecting a plurality of items" is performed, the electronic pen 6 is dragged onto all the items to be selected while the button 100 is held down.

Display Screen

Figure 13:
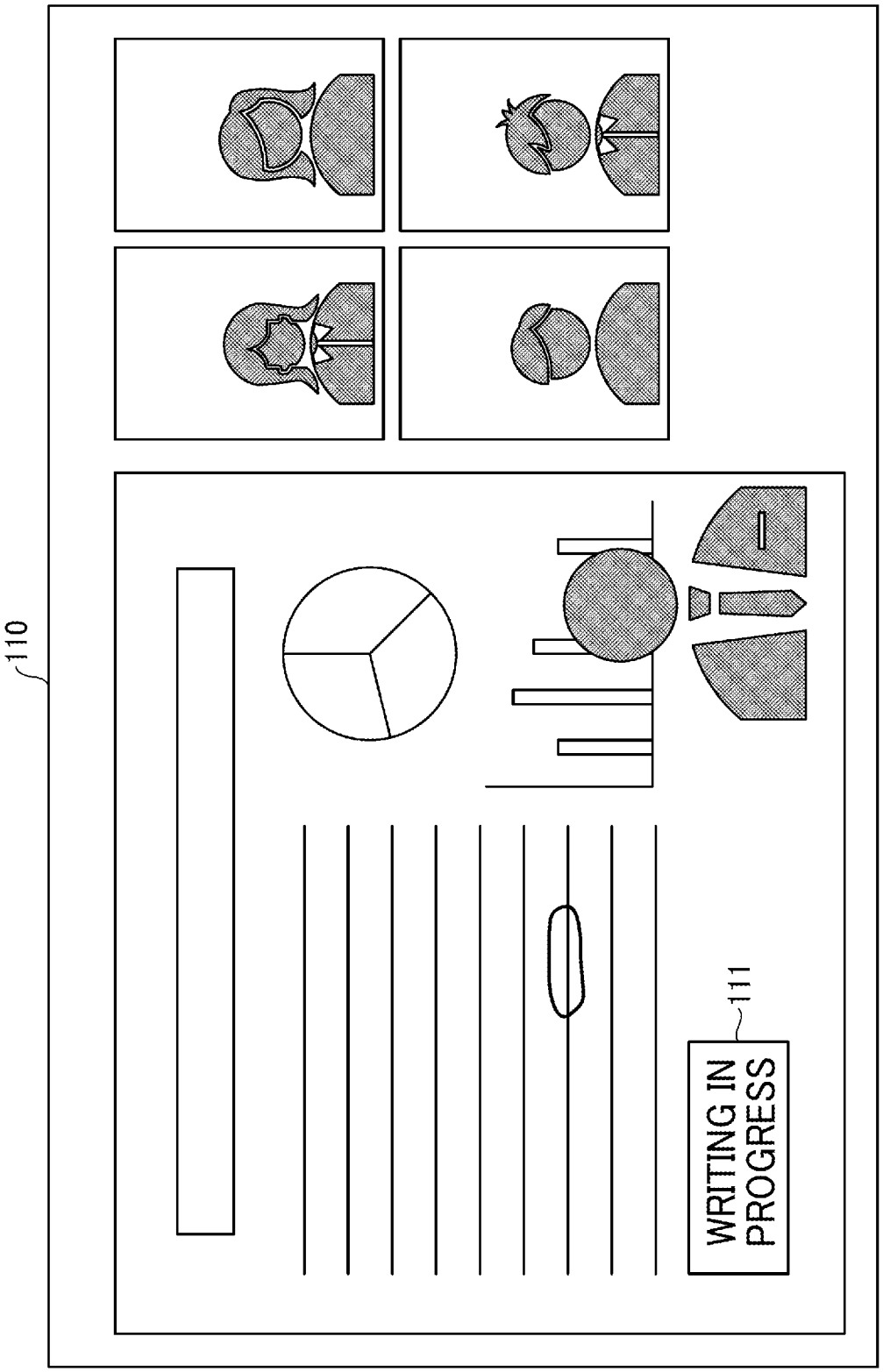
FIG. 13 is a diagram illustrating a display screen according to embodiments of the present disclosure.

FIG. 13 is a diagram illustrating a display screen according to embodiments of the present disclosure. A display screen 110 illustrated in FIG. 13 is, for example, a screen used for a teleconference. As illustrated in FIG. 13, during the writing operation using the electronic pen 6, information indicating that the writing operation is in progress (for example, "writing in progress") may be displayed on the display screen 110. In other words, the display control unit 12 of the communication terminal 5 or the electronic whiteboard 2 may display, for example, based on an event relating to the operation of the electronic pen 6 received by the reception unit 13 of the communication terminal 5 or the electronic whiteboard 2, the screen of the whiteboard application on which the information indicating that the writing operation is in progress (for example, "writing in progress") is presented on the display 506 of the communication terminal 5 or the display 208 of the electronic whiteboard 2. In this way, it is possible to grasp whether anyone of the participants in the teleconference is currently in the writing operation. Accordingly, it is possible to adjust the timing so that the conversation starts after the writing operation is completed, for example.

While some embodiments of the present disclosure have been described, the present disclosure is not limited to such embodiments and may be modified and substituted in various ways without departing from the spirit of the present disclosure.

For example, the functional configuration according to the present embodiments illustrated in FIG. 4 is divided according to functions in order to facilitate understanding of the processing executed by the communication terminal 5 and the electronic whiteboard 2. No limitation to the scope of the present disclosure is intended by how the processing units are divided or by the names of the processing units. The processing units executed by the communication terminal 5 and the electronic whiteboard 2 may be divided into a greater number of processing units in accordance with the contents of the processing units. In addition, a single processing unit can be divided to include a greater number of processing units.

Each of the functions described above in the embodiments of the present disclosure may be implemented by one processing circuit or a plurality of processing circuits. The "processing circuit or circuitry" herein includes a programmed processor to execute functions by software, such as a processor implemented by an electronic circuit, and devices, such as an application specific integrated circuit (ASIC), a digital signal processor (DSP), a field programmable gate array (FPGA), and circuit modules known in the art arranged to perform the recited functions.

The group of apparatuses or devices described in the above-described embodiments of the present disclosure are merely one example of a plurality of computing environments that implement embodiments of the present disclosure. In some embodiments, each of the communication terminal 5 and the electronic whiteboard 2 includes multiple computing devices such as a server cluster. The multiple computing devices communicate with one another through any type of communication link including, for example, a network or a shared memory, and perform the operations disclosed herein.

Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising circuitry configured to:
    receive contact event information indicating that an electronic pen comes into contact with a screen, move event information indicating that the electronic pen moves in a state of being in contact with the screen, separation event information indicating that the electronic pen detaches from the screen, and button pressing information indicating that a button of the electronic pen is pressed, the electronic pen configured to operate in an operation mode including a first mode or a second mode;
    switch between the first mode and the second mode by pressing or releasing the button of the electronic pen;
    in response to receiving the contact event information, determine whether the operation mode of the electronic pen is the first mode or the second mode;
    start the determined operation mode; and
    in response to receiving the move event information after the operation mode is started, execute a writing operation using the electronic pen, and maintain the operation mode regardless of pressing or releasing the button of the electronic pen during the writing operation, until receiving the separation event information.

2. The information processing apparatus according to claim 1, wherein the circuitry is further configured to, in a case in which the contact event information is received within a certain period of time after the separation event information is received during the writing operation, ignore the separation event information and the contact event information, and continue the writing operation.

3. The information processing apparatus according to claim 1, further comprising:
    a contact sensor configured to detect the electronic pen, wherein
    the button of the electronic pen has at least one of a function equivalent to a right click of a mouse or a function of selecting an item, and
    the electronic pen further has an indicator indicating a state of the writing operation using the electronic pen.

4. The information processing apparatus according to claim 1, wherein the circuitry is further configured to, during the writing operation, display a display screen that presents information indicating that the writing operation using the electronic pen is in progress.

5. An information processing system comprising circuitry configured to:
    receive contact event information indicating that an electronic pen comes into contact with a screen, move event information indicating that the electronic pen moves in a state of being in contact with the screen, separation event information indicating that the electronic pen detaches from the screen, and button pressing information indicating that a button of the electronic pen is pressed, the electronic pen configured to operate in an operation mode including a first mode or a second mode;
    switch between the first mode and the second mode by pressing or releasing the button of the electronic pen;
    in response to receiving the contact event information, determine whether the operation mode of the electronic pen is the first mode or the second mode;
    start the determined operation mode; and
    in response to receiving the move event information after the operation mode is started, execute a writing operation using the electronic pen, and maintain the operation mode regardless of pressing or releasing the button of the electronic pen during the writing operation, until receiving the separation event information.

6. The information processing system of claim 5, further comprising the electronic pen.

7. An information processing method, comprising:
    receiving contact event information indicating that an electronic pen comes into contact with a screen, move event information indicating that the electronic pen moves in a state of being in contact with the screen, separation event information indicating that the electronic pen detaches from the screen, and button pressing information indicating that a button of the electronic pen is pressed, the electronic pen configured to operate in an operation mode including a first mode or a second mode;
    switching between the first mode and the second mode by pressing or releasing the button of the electronic pen;
    in response to receiving the contact event information, determining whether the operation mode of the electronic pen is the first mode or the second mode;
    starting the determined operation mode; and
    in response to receiving the move event information after the operation mode is started, executing a writing operation using the electronic pen, and maintaining the operation mode regardless of pressing or releasing the button of the electronic pen during the writing operation, until receiving the separation event information.

8. A non-transitory recording medium storing a plurality of program codes which, when executed by one or more processors, causes the one or more processors to perform the method according to claim 7.

* * * * *